(12) United States Patent
Ji et al.

(10) Patent No.: US 10,489,078 B2
(45) Date of Patent: Nov. 26, 2019

(54) CONTROLLER KEEPING A SEQUENCE OF DATA AND OPERATING METHOD THEREOF

(71) Applicant: SK hynix Inc., Gyeonggi-do (KR)

(72) Inventors: SeungGu Ji, Seoul (KR); YoungHo Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/655,206

(22) Filed: Jul. 20, 2017

(65) Prior Publication Data

US 2018/0188962 A1 Jul. 5, 2018

(30) Foreign Application Priority Data

Dec. 30, 2016 (KR) .................. 10-2016-0184095

(51) Int. Cl.
*G06F 3/06* (2006.01)
*G06F 12/02* (2006.01)
*G06F 12/06* (2006.01)
*G06F 11/10* (2006.01)

(52) U.S. Cl.
CPC .............. *G06F 3/064* (2013.01); *G06F 3/061* (2013.01); *G06F 3/0679* (2013.01); *G06F 11/1076* (2013.01); *G06F 12/0246* (2013.01); *G06F 12/0607* (2013.01); *G06F 12/0253* (2013.01); *G06F 2212/1016* (2013.01); *G06F 2212/7201* (2013.01); *G06F 2212/7208* (2013.01)

(58) Field of Classification Search
CPC ...... G06F 3/064; G06F 3/061; G06F 12/0246; G06F 11/1076; G06F 12/0607; G06F 3/0679; G06F 12/0253; G06F 2212/7208; G06F 2212/1016; G06F 2212/7201

See application file for complete search history.

(56) References Cited

U.S. PATENT DOCUMENTS

| | | | | |
|---|---|---|---|---|
| 4,943,869 | A * | 7/1990 | Horikawa | G06T 9/005 382/245 |
| 8,214,578 | B2 * | 7/2012 | Chu | G06F 12/0246 711/103 |
| 2004/0264254 | A1 * | 12/2004 | Eggleston | G06F 11/1068 365/185.33 |
| 2010/0191922 | A1 * | 7/2010 | Dickey | G06F 3/061 711/154 |
| 2010/0199024 | A1 * | 8/2010 | Jeong | G06F 12/0246 711/103 |
| 2011/0013690 | A1 * | 1/2011 | Kobayashi | H04J 3/1658 375/240 |
| 2014/0164681 | A1 * | 6/2014 | Ravimohan | G06F 12/023 711/103 |

(Continued)

FOREIGN PATENT DOCUMENTS

KR 10-2017-0078315 7/2017

*Primary Examiner* — Tasnima Matin
(74) *Attorney, Agent, or Firm* — IP & T Group LLP

(57) ABSTRACT

A controller includes a memory suitable for storing first data read from first memory blocks of a first super memory block included in a memory device; a rearranging unit suitable for rearranging the first data stored in the memory based on sequence-information of the first data stored in the memory; and a processor suitable for controlling the memory device to write the rearranged first data in a second super memory block of the memory device.

20 Claims, 13 Drawing Sheets

(56) References Cited

U.S. PATENT DOCUMENTS

| | | | |
|---|---|---|---|
| 2015/0186270 A1* | 7/2015 | Peng | G11C 16/16 |
| | | | 711/3 |
| 2016/0056840 A1* | 2/2016 | Siegert | H03M 7/30 |
| | | | 711/114 |
| 2016/0276002 A1* | 9/2016 | Lee | G06F 13/1642 |
| 2018/0107593 A1* | 4/2018 | Ogawa | G06F 13/10 |
| 2018/0188962 A1* | 7/2018 | Ji | G06F 3/061 |

\* cited by examiner

CONTROLLER KEEPING A SEQUENCE OF DATA AND OPERATING METHOD THEREOF

CROSS-REFERENCE TO RELATED APPLICATIONS

The present application claims priority of Korean Patent Application No. 10-2016-0184095, filed on Dec. 30, 2016, which is incorporated herein by reference in its entirety.

BACKGROUND

1. Field

Various embodiments of the present invention relate to a controller and, more particularly, a controller and operation method thereof.

2. Description of the Related Art

The computer environment paradigm has shifted to ubiquitous computing systems that can be used anytime and anywhere. As a result, use of portable electronic devices such as mobile phones, digital cameras, and notebook computers continues to increase rapidly. These portable electronic devices generally use a memory system having one or more semiconductor memory devices also referred to as data storage devices. The data storage device may be used as the main memory device or an auxiliary memory device of a portable electronic device.

Semiconductor memory devices provide excellent stability, durability, high information access speed, and low power consumption, since they have no moving parts. Examples of data storage devices include universal serial bus (USB) memory devices, memory cards having various interfaces, and solid state drives (SSD).

SUMMARY

Various embodiments are directed to a controller capable of preventing performance degradation of a read operation to sequential data even after a plurality of copy operations are performed for the sequential data, and an operation method thereof.

In accordance with an embodiment of the present invention, a controller may include: a memory suitable for storing first data read from first memory blocks of a first super memory block included in a memory device; a rearranging unit suitable for rearranging the first data stored in the memory based on sequence-information of the first data stored in the memory; and a processor suitable for controlling the memory device to write the rearranged first data in a second super memory block of the memory device.

Preferably, the rearranging unit may rearrange the first data sequentially based on sequence-information.

Preferably, the rearranging unit may rearrange the first data when a size of the first data is equal to or larger than a first threshold.

Preferably, the first threshold may be equal to or larger than a storage capacity of one or more pages of the first memory blocks included in the first super memory block.

Preferably, the sequence-information may include information of logic block addresses.

Preferably, the first data may be sequential data.

Preferably, the processor may copy the first data from the first super memory block to the second super memory block according to the order of the sequence-information of the first data.

Preferably, the first threshold may be equal to or smaller than a predetermined storage capacity of the first super memory block.

Preferably, the rearranging unit may rearrange the first data stored in the memory when the processor copies the first data from the first super memory block to the second super memory block via the memory.

Preferably, the processor may copy the first data during a garbage collection operation.

In accordance with an embodiment of the present invention, a method for operating a controller includes: storing first data read from first memory blocks of a first super memory block included in a memory device; rearranging the first data stored in the memory based on sequence-information of the first data stored in the memory; and controlling the memory device to write the rearranged first data in a second super memory block of the memory device.

Preferably, the rearranging may rearrange the first data sequentially based on sequence-information.

Preferably, the rearranging may rearrange the first data when a size of first data is equal to or larger than a first threshold.

Preferably, the first threshold may be equal to or larger than a storage capacity of one or more pages of the first memory blocks included in the first super memory block.

Preferably, the sequence-information may include information of logic block addresses.

Preferably, the first data may be sequential data.

Preferably, the processor may copy the first data from the first super memory block to the second super memory block according to the order of the sequence-information of the first data.

Preferably, wherein the first threshold may be equal to or smaller than a predetermined storage capacity of the first super memory block.

Preferably, the rearranging may rearrange the first data stored in the memory during a copy operation of copying the first data from the first super memory block to the second super memory block via the memory.

Preferably, the copy operation may be performed during a garbage collection operation.

DETAILED DESCRIPTION

Figure 1:
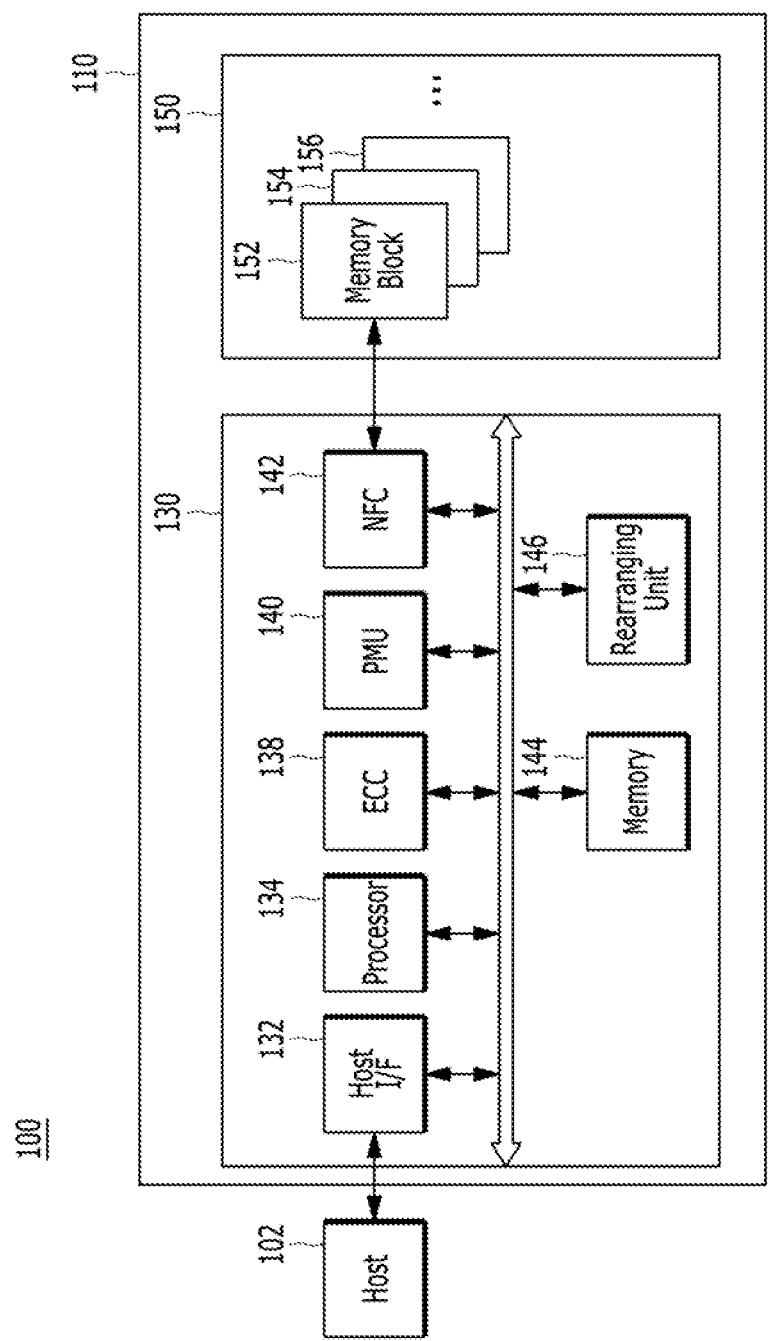
FIG. 1 is a diagram illustrating a data processing system including a memory system according to an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure is thorough and complete. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. Furthermore, when it is described that one "comprises" (or "includes") or "has" some elements, it should be understood that it may comprise (or include) or have other elements as well as those elements if there is no specific limitation. The terms of singular form may include plural forms unless stated otherwise.

FIG. 1 is a block diagram illustrating a data processing system including a memory system according to an embodiment.

Referring to FIG. 1, a data processing system 100 may include a host 102 and a memory system 110.

The host 102 may include, for example, a portable electronic device such as a mobile phone, an MP3 player and a laptop computer or an electronic device such as a desktop computer, a game player, a TV, a projector and the like.

The host 102 may include one or more operating system, and the operation system may control and manage operation and performance of the host 102, and provide inter-operation between the host 102 and user using the data processing system 100 or the memory system 110. The operating system may support operation and performance corresponding to purpose of use. For example, depending on the mobility of the host, it may be classified into a general operating system and a mobile operating system. And, depending on the environment of user, the general operating system may be classified into a personal operating system and an enterprise operating system. For example, the personal operating system may provide service for general users and include window and chrome and so on. The enterprise operating system may be specialized system to provide high quality, and include windows server, linux and unix and so on. And the mobile operating system may be specialized system to provide a system power saving function and a mobile service to users and include android, IOS, windows mobile and so on. The host 102 may include a plurality of the operating systems, and perform an operating system for operation with the memory system 110 corresponding to request of user.

The memory system 110 may operate in response to a request from the host 102, and in particular, store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetic RAM (MRAM) and a resistive RAM (RRAM).

The memory system 110 may include a memory device 150 which stores data to be accessed by the host 102, and a controller 130 which may control storage of data in the memory device 150.

The controller 130 and the memory device 150 may be integrated into one semiconductor device. For instance, the controller 130 and the memory device 150 may be integrated into one semiconductor device such as a solid state drive (SSD). When the memory system 110 is used as a SSD, the operation speed of the host 102 that is electrically coupled with the memory system 110 may be significantly increased.

The controller 130 and the memory device 150 may be integrated into one semiconductor device and be configured as a memory card. The controller 130 and the memory card 150 may be integrated into one semiconductor device and be configured as a memory card such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

The memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted, for example, the memory device may store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a nonvolatile memory device, for example, a flash memory. The flash memory may have a three-dimensional (3D) stack structure. The memory device may have any other suitable structure.

The controller 130 may control overall operations of the memory device 150, such as read, write, program and erase operations. For example, the controller 130 of the memory system 110 may control the memory device 150 in response to a request from the host 102. The controller 130 may provide the data read from the memory device 150, to the host 102, and/or may store the data provided from the host 102 into the memory device 150.

The controller 130 may include a host interface unit 132, a processor 134, an error correction code (ECC) unit 138, a power management unit 140, a NAND flash controller 142, a memory 144 and a rearranging unit 146.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

When a size of data stored in the memory 144 exceeds a first predetermined threshold, the rearranging unit 146 may rearrange data based on sequence-information of data. The sequence-information may include information for a logical block address of data.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
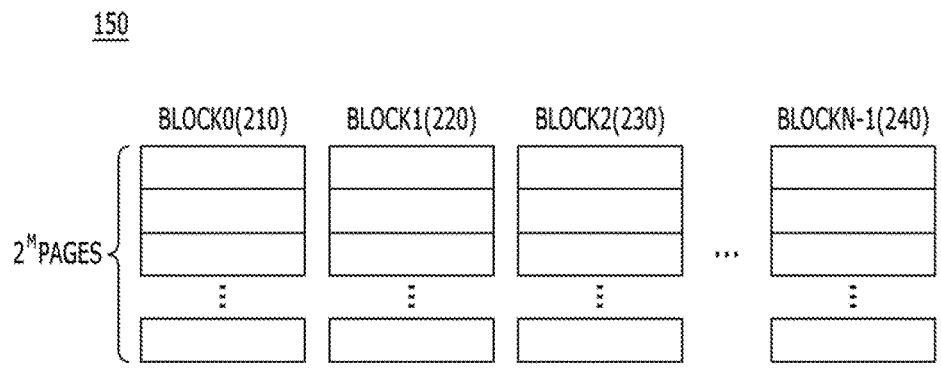
FIG. 2 is a diagram illustrating a memory device according to an embodiment of the present invention.

FIG. 2 is a schematic diagram illustrating the memory device 150 shown in FIG. 1.

Referring to FIG. 2, the memory device 150 may include a plurality of memory blocks, for example, zeroth to (N−1)$^{th}$ blocks 210 to 240. Each of the plurality of memory blocks 210 to 240 may include a plurality of pages, for example, 2$^M$ number of pages (2$^M$ PAGES). Each of the plurality of pages may include a plurality of memory cells. A plurality of word lines may be electrically coupled to the memory cells.

The memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
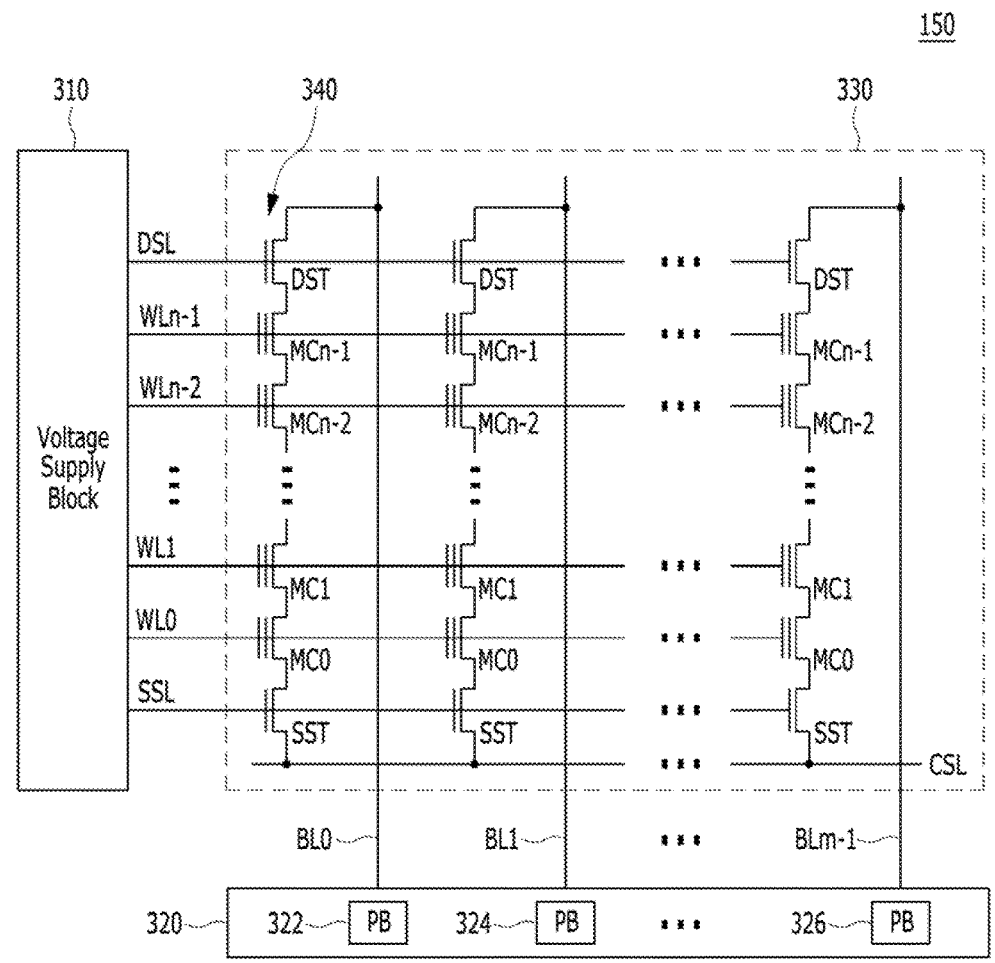
FIG. 3 is a circuit diagram illustrating a memory block in a memory device according to an embodiment of the present invention.

FIG. 3 is a circuit diagram illustrating one of the plurality of memory blocks 152 to 156 shown in FIG. 1.

Referring to FIG. 3, the memory block 152 of the memory device 150 may include a plurality of cell strings 340 which are electrically coupled to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured by single level cells (SLC) each of which may store 1 bit of information, or by multi-level cells (MLC) each of which may store data information of a plurality of bits. The strings 340 may be electrically coupled to the corresponding bit lines BL0 to BLm-1, respectively. For reference, in FIG. 3, 'DSL' denotes a drain select line, 'SSL' denotes a source select line, and 'CSL' denotes a common source line.

While FIG. 3 only shows, as an example, the memory block 152 which is configured by NAND flash memory cells, it is to be noted that the memory block 152 of the memory device 150 according to the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. For example, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

Figure 4:
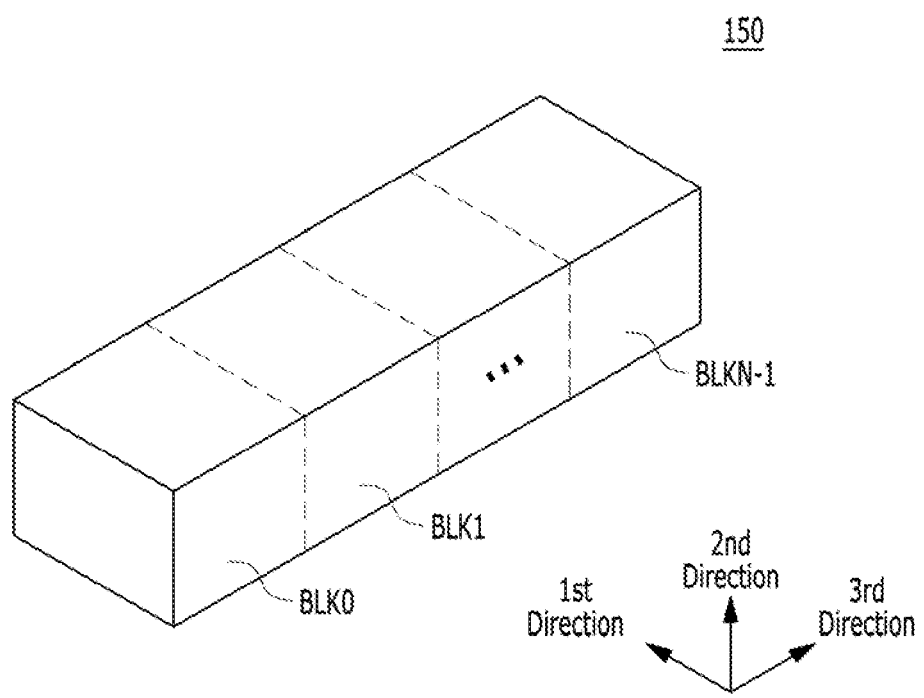
FIG. 4 is a diagram schematically illustrating an aspect of the memory device shown in FIG. 2 according to an embodiment of the present invention.

FIG. 4 is a block diagram illustrating an example of the plurality of memory blocks 152 to 156 of the memory device 150 shown in FIG. 1.

Referring to FIG. 4, the memory device 150 may include a plurality of memory blocks BLK0 to BLKN-1, and each of the memory blocks BLK0 to BLKN-1 may be realized in a three-dimensional (3D) structure or a vertical structure. Each memory block BLK0 to BLKN-1 may include a structure which extends in first to third directions, for example, an x-axis direction, a y-axis direction and a z-axis direction.

The respective memory blocks BLK0 to BLKN-1 may include a plurality of NAND strings NS which extend in the second direction. The plurality of NAND strings NS may be provided in the first direction and/or the third directions. Each NAND string NS may be electrically coupled to a bit line BL, at least one source select line SSL, at least one ground select line GSL, a plurality of word lines WL, at least one dummy word line DWL, and a common source line CSL. The respective memory blocks BLK0 to BLKN-1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
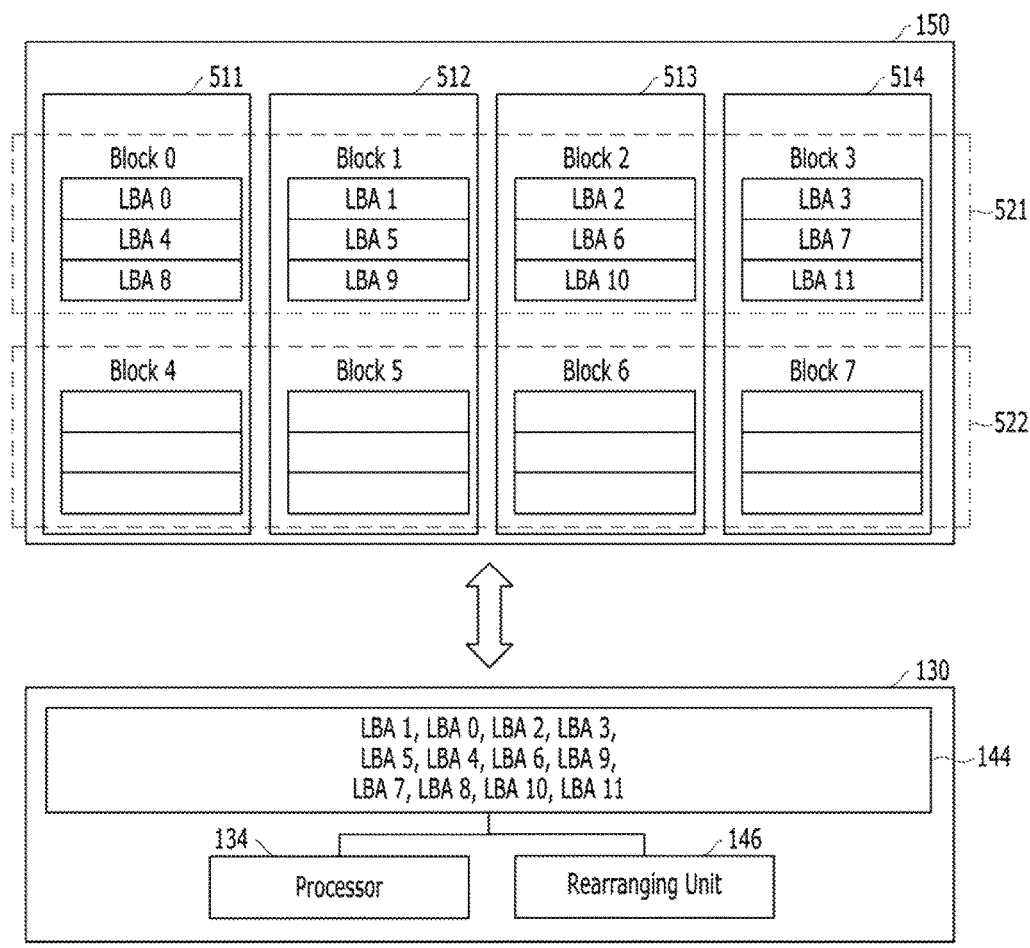
FIG. 5 is a diagram illustrating a memory system shown in FIG. 1.

FIG. 5 is a diagram illustrating the memory system 110.

The processor 134 may manage a super memory block. The super memory block may include a plurality of memory blocks, which the processor 134 can control at a time. Referring to FIG. 5, the processor 134 may manage super memory blocks 521 and 522 respectively grouped by one or more memory blocks BLOCK 0 to BLOCK 7 included in respective memory dies 511 to 514 of the memory device 150. FIG. 5 illustrates that the processor 134 manage memory blocks BLOCK 0 to 3 through a first super memory block 521, and manage memory blocks BLOCK 4 to 7 through a second super memory block 522.

The processor 134 may control the memory blocks BLOCK 0 to 7 of the super memory blocks 521 and 522 through an interleaving scheme such as the channel interleaving, the memory die interleaving, the memory chip interleaving, a way interleaving, and so on. The processor 134 may sequentially control the memory blocks BLOCK 0 to 7 of the super memory blocks 521 and 522 on a page basis through the interleaving scheme.

Referring to FIG. 5, when the processor 134 receives from the host 102 a write request of sequential data LBA 0 to 11, logical block addresses of which are sequential, the processor 134 may control the memory device 150 to write the sequential data LBA 0 to 3 respectively into first pages of the memory blocks BLOCK 0 to 3 in a sequential manner.

Likewise, the processor 134 may control the memory device 150 to write the sequential data LBA 4 to 11 respectively into second pages and third pages of the memory blocks BLOCK 0 to 3 in sequential manner. That is, the processor 134 may control the memory device 150 to write the sequential data LBA 0 to 11 respectively into the first super memory block 521 through the interleaving scheme.

Referring to FIG. 5, when the processor 134 receive from the host 102a read request of sequential data LBA 0 to 11 stored in the first super memory block 521, the processor 134 may control the memory device 150 to read the sequential data LBA 0 to 3 respectively from the first pages of the memory blocks BLOCK 0 to 3 in sequential manner.

Likewise, the processor 134 may control the memory device 150 to read the sequential data LBA 4 to 11 respectively from the second pages or third pages of the memory blocks BLOCK 0 to 3 in sequential manner. That is, the processor 134 may control the memory device 150 to read the sequential data LBA 0 to 11 respectively from the first super memory block 521 through the interleaving scheme.

Figure 6:
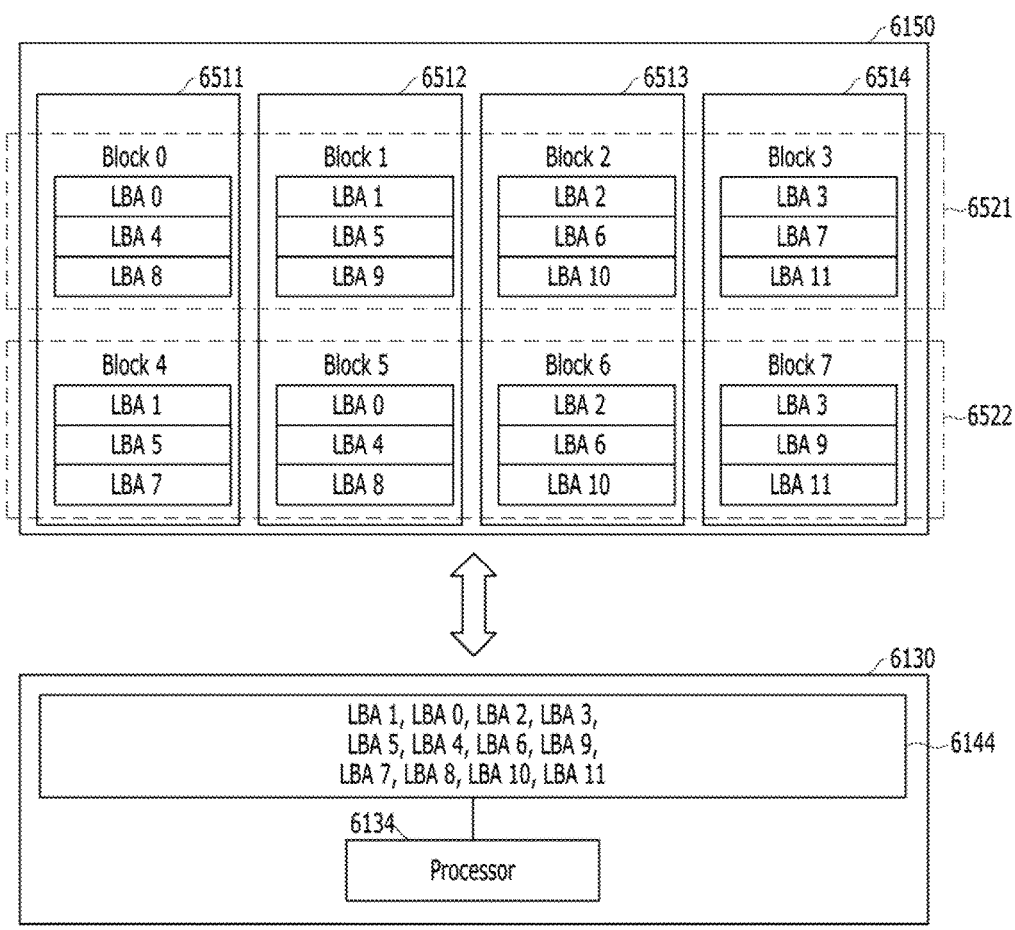
FIG. 6 is a diagram illustrating a comparative example of moving data from a memory of a controller to a super memory block without rearranging the data.

FIG. 6 is a diagram illustrating a comparative example of moving data from a memory 6144 of a controller 6130 to a super memory block 6522 without rearranging the data.

Although a processor of the controller 6130 controls a memory device 6150 through the interleaving scheme, sequential data LBA 0 to 11 may be randomly read from a first super memory block 6521 in the memory device 6150 and the randomly read sequential data LBA 0 to 11 may be stored in the memory 6144 in random manner. This is because times required to read data from respective memory blocks BLOCK 0 to 7 of the first super memory block 6521 are different from one another.

Referring to FIG. 6, when the processor 6134 of the controller 6130 controls the memory device 6150 to write the sequential data LBA 0 to 11, which are randomly stored in the memory 6144 of the controller 6130 through the interleaving scheme, into a second memory block 6522 during a copy operation of copying the sequential data LBA 0 to 11 from the first super memory block 6521 to the second super memory block 6522 through the memory 6144, the sequential data LBA 0 to 11 may be randomly stored in the second memory block 6522. That is, when the processor copies the sequential data LBA 0 to 11 stored in the first super memory block 6521 into the second super memory block 6522 during a garbage collection operation for example, the sequential data LBA 0 to 11 may eventually become random while being stored in the second super memory block 6522. Accordingly, it may take longer time to read out the randomized sequential data LBA 0 to 11 from the second super memory block 6522, which decreases efficiency of the reading operation to the originally sequential data LBA 0 to 11.

In accordance with an embodiment of the present invention, the controller 130 may include the rearranging unit 146 suitable for rearranging the order of the randomized sequential data. The controller 130 may solve the problem which takes longer time to read out the randomized sequential data using the rearranging unit 146. The rearranging unit 146 may be implemented by using a processor, a computer, or a firm-ware type processing unit.

When the size of the sequential data LBA 0 to 11 stored in the memory 144 exceeds a first threshold, the rearranging unit 146 may rearrange the sequential data LBA 0 to 11 based on the sequence-information (i.e., logic block addresses) of the sequential data LBA 0 to 11. The first threshold may be equal to or larger than a storage capacity of one or more pages of the super memory blocks 521 and 522. For example, when the storage capacity of each page of the memory blocks BLOCK 0 to 7 in the super memory blocks 521 and 522 is 16 KB, the first threshold may be equal to or greater than 16 KB. As the first threshold becomes larger, the rearranging unit 146 may rearrange more data.

Figure 7:
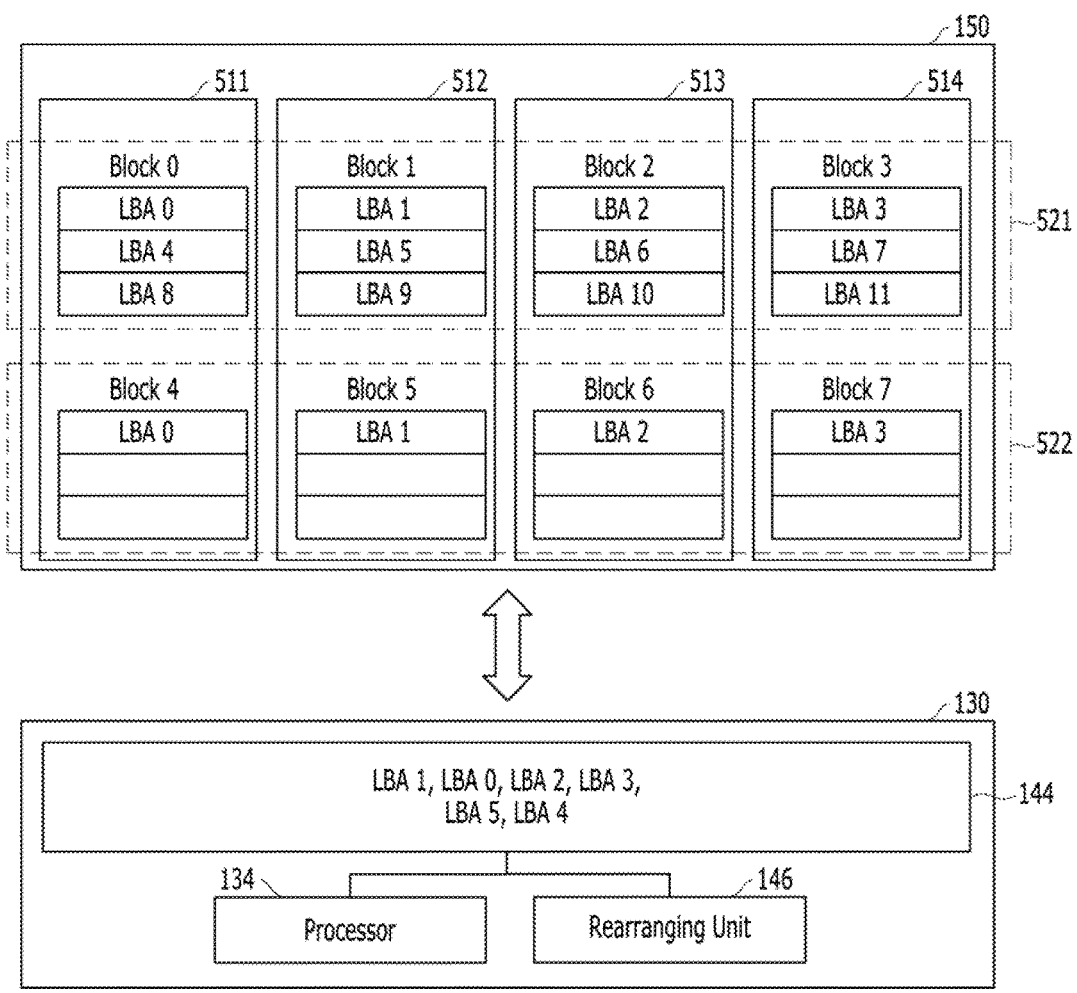
FIGS. 7 to 9 are diagrams illustrating an operation of a controller according to an embodiment of the present invention.
Figure 8:
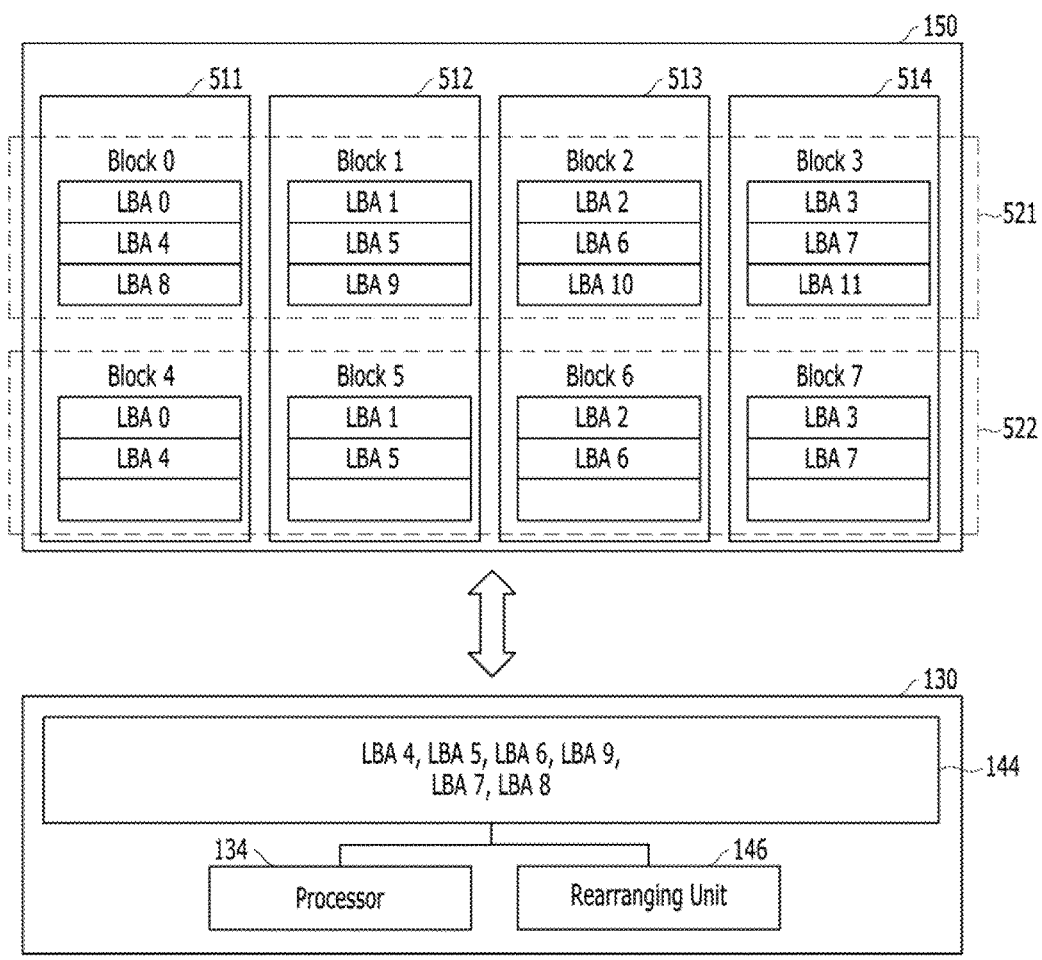
Figure 9:
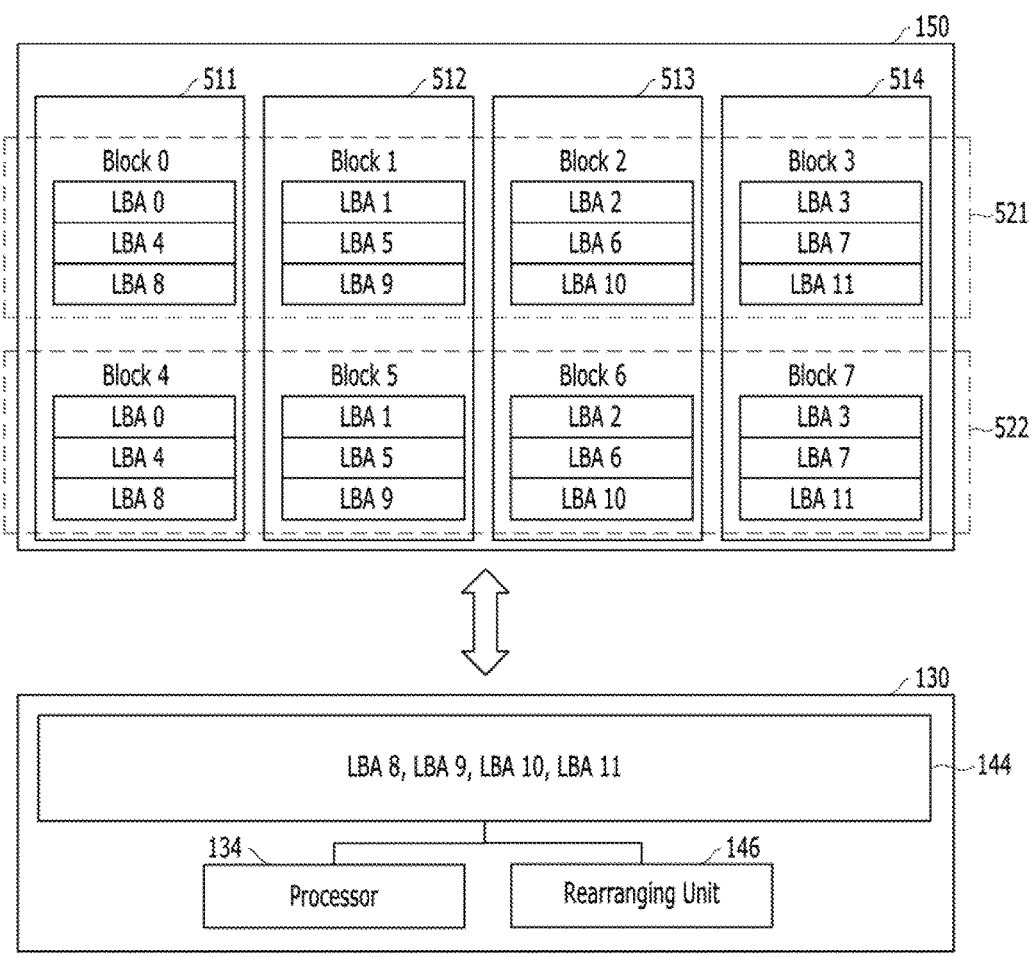

FIGS. 7 to 9 are diagrams illustrating an operation of the controller 130 according to an embodiment of the present invention.

In accordance with an embodiment of the present invention, the processor 134 may copy the sequential data LBA 0 to 11, which are stored in the first super memory block 521, into the second super memory block 522 through the memory 144. First, the processor 134 may store the sequential data in the memory 144. However, the sequential data may become random while being stored in the memory 144. The rearranging unit 146 may rearrange the randomly stored data LBA 0 to 11 in the memory 144.

Hereinafter, it is assumed that each size of the sequential data LBA 0 to 11 is equal to storage capacity of each page in the memory blocks BLOCK 0 to 7. Further, it is assumed that the first threshold is storage capacity of 5 pages. For example, when the storage capacity of each page in the memory block BLOCK 0 to 7 is 16 KB, the each size of the sequential data LBA 0 to 11 may be 16 KB and the first threshold may be 80 KB.

As illustrated in FIG. 7, when the sequential data LBA 0 to 5 are read from the first super memory block 521 and then stored in the memory 144 during the copy operation of copying in a sequential manner the sequential data LBA 0 to 11 from the first super memory block 521 to the second super memory block 522 via the memory 144, the size of the sequential data LBA 0 to 5 may be 96 KB and thus exceed the first threshold of 80 KB. Therefore, the rearranging unit 146 may rearrange the sequential data LBA 0 to 5, which are now stored in the memory 144, based on the logic block addresses of the sequential data LBA 0 to 5. When the sequential data LBA 0 to 5 which are stored in the memory are rearranged, the processor 134 may store into first pages of the second super memory block 522 four sequential data LBA 0 to 3 among the sequential data LBA 0 to 5 rearranged in the memory 144.

As illustrated in FIG. 8, during the copy operation of copying in a sequential manner the sequential data LBA 0 to 11 from the first super memory block 521 to the second super memory block 522 via the memory 144, four sequential data LBA 6 to 9 may be further stored in the memory 144 while two sequential data LBA 4 and 5 still remain stored in the memory 144. Therefore, the size, which is 96 KB, of the six sequential data LBA 4 to 9 may exceed the first threshold, which is 80 KB.

Accordingly, rearranging unit 146 may rearrange the six sequential data LBA 4 to 9 based on logic block addresses of the sequential data LBA 4 to 9 stored in the memory 144. When the sequential data LBA 4 to 9 stored in the memory 144 are rearranged, the processor 134 may store into second pages of the second super memory block 522 four sequential data LBA 4 to 7 among the sequential data LBA 4 to 9 rearranged in the memory 144.

As Illustrated in FIG. 9, during the copy operation of copying in sequential manner the sequential data LBA 0 to 11 from the first super memory block 521 to the second super memory block 522 via the memory 144, two sequential data LBA 10 to 11 may be further stored in the memory 144 while two sequential data LBA 8 and 9 still remain stored in the memory 144. Therefore, the size, which is 64 KB, of the sequential data LBA 8 to 11 stored in the memory 144 may not exceed the first threshold, which is 80 KB.

Accordingly, the rearranging unit 146 may not rearrange the sequential data LBA 8 to 11 stored in the memory 144. And the processor 134 may store the sequential data LBA 8 to 11, which are not rearranged in the memory 144, into third pages of the second memory block 522.

In an embodiment, it is possible that the rearranging unit 146 rearranges the sequential data LBA 8 to 11 stored in the memory 144 despite the first threshold.

In an embodiment of the present invention described above, the memory device 150 may write the sequential data into the super memory block immediately when the memory device 150 receives the sequential data from the processor 134. In an embodiment, the memory device 150 may gather the sequential data each time the processor 134 provides partial pieces of all the sequential data until all of the sequential data is provided to the memory device 150, and then the memory device 150 write all of the sequential data at once into the second super memory block 522 through the one-shot program scheme.

In accordance with an embodiment of the present invention as described above, during the copy operation of copying in sequential manner the sequential data LBA 0 to 11 from the first super memory block 521 to the second super memory block 522 via the memory 144, the memory system 110 may store the sequential data LBA 0 to 11 into the second super memory block 522 in a sequential manner. Therefore, despite several copy operations of copying the sequential data LBA 0 to 11 from the first super memory block 521 to the second super memory block 522 via the memory 144, it may not take longer time to read out the sequential data LBA 0 to 11 from the second super memory block 522, which prevents efficiency decrease of the reading operation to the sequential data LBA 0 to 11.

FIGS. 10 to 18 are diagrams schematically illustrating application examples of the data processing system of FIG. 1.

Figure 10:
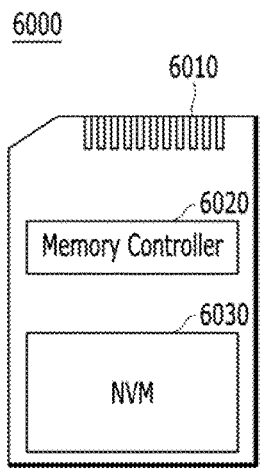
FIGS. 10 to 18 are diagrams schematically illustrating the other embodiments of a data process system including a memory system according to an embodiment of the present invention.

FIG. 10 is a diagram schematically illustrating another example of the data processing system including the memory system in accordance with the present embodiment. FIG. 10 schematically illustrates a memory card to which a memory system in accordance with an embodiment of the present invention is applied.

Referring to FIG. 10, the memory card 6000 may include a memory controller 6020, a memory device 6030 and a connector 6010.

More specifically, the memory controller 6020 may be connected to the memory device 6030 embodied by a nonvolatile memory, and configured to access the memory device 6030. For example, the memory controller 6020 may be configured to control read, write, erase and background operations of the memory device 6030. The memory controller 6020 may be configured to provide an interface between the memory device 6030 and a host, and drive firmware for controlling the memory device 6030. That is, the memory controller 6020 may correspond to the controller 130 of the memory system 110 described with reference to FIG. 1, and the memory device 6030 may correspond to the memory device 150 of the memory system 110 described with reference to FIG. 1.

Thus, the memory controller 6020 may include a RAM, a processing unit, a host interface, a memory interface and an error correction unit.

The memory controller 6020 may communicate with an external device, for example, the host 102 of FIG. 1 through the connector 6010. For example, as described with reference to FIG. 1, the memory controller 6020 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6030 may be implemented by a nonvolatile memory. For example, the memory device 6030 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6020 and the memory device 6030 may be integrated into a single semiconductor device. For example, the memory controller 6020 and the memory device 6030 may construct a solid state driver (SSD) by being integrated into a single semiconductor device. The memory card 6000 may be a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
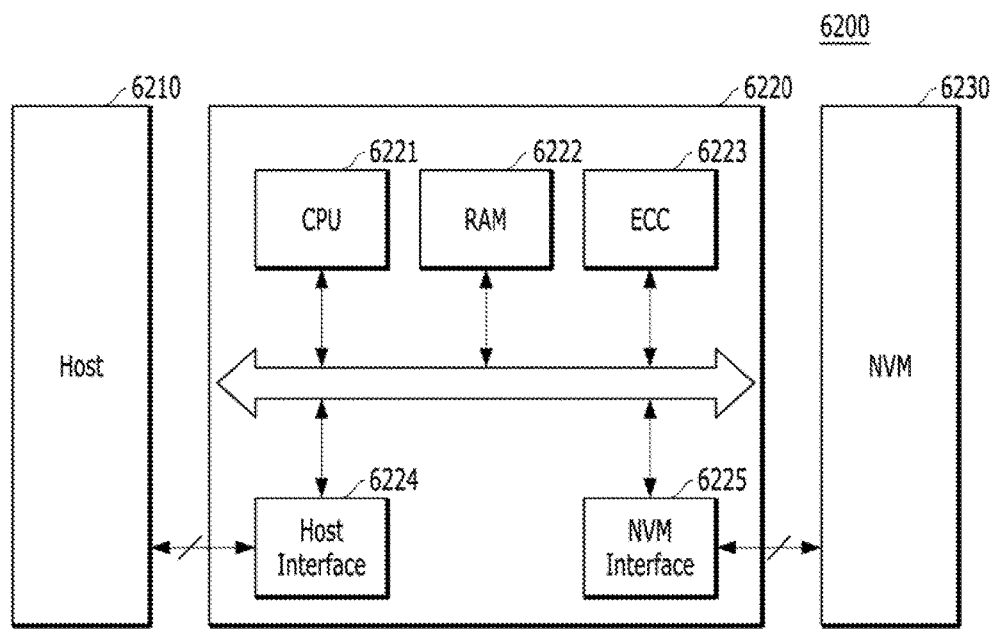

FIG. 11 is a diagram schematically illustrating another example of the data processing system including the memory system in accordance with the present embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fall bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 12:
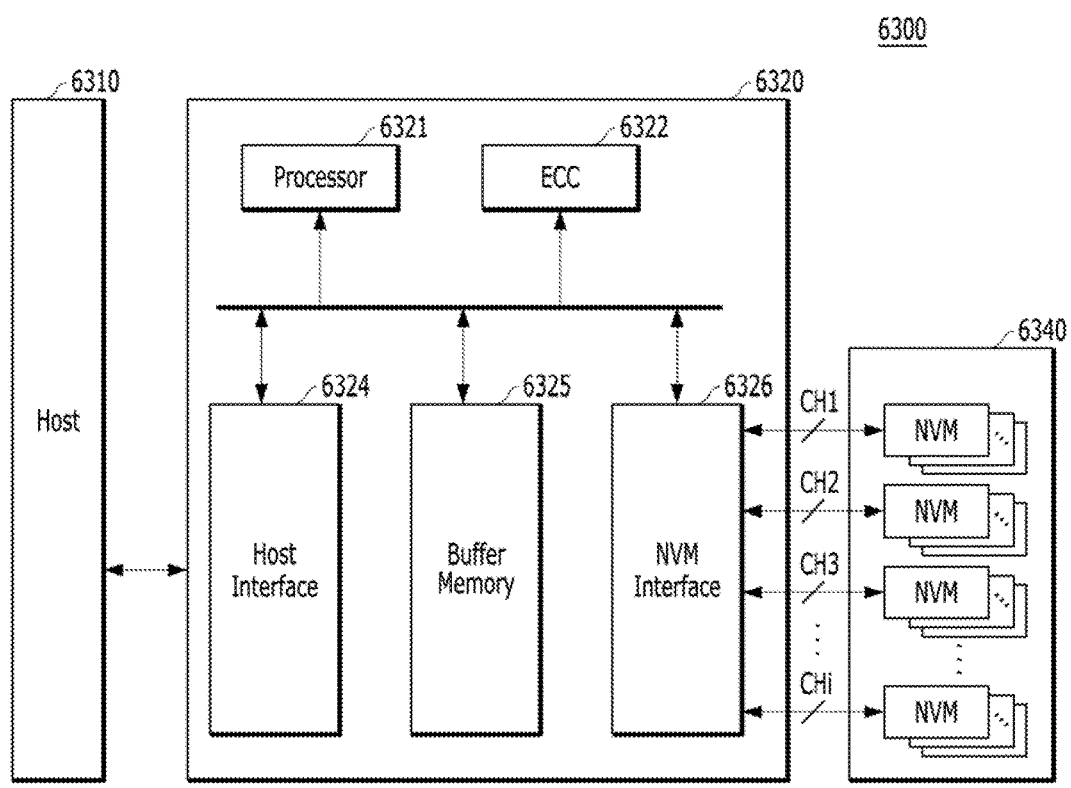

FIG. 12 is a diagram schematically illustrating another example of the data processing system including the memory system in accordance with the present embodiment. FIG. 12 schematically illustrates an SSD to which the memory system in accordance with the present embodiment is applied.

Referring to FIG. 12, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 12 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
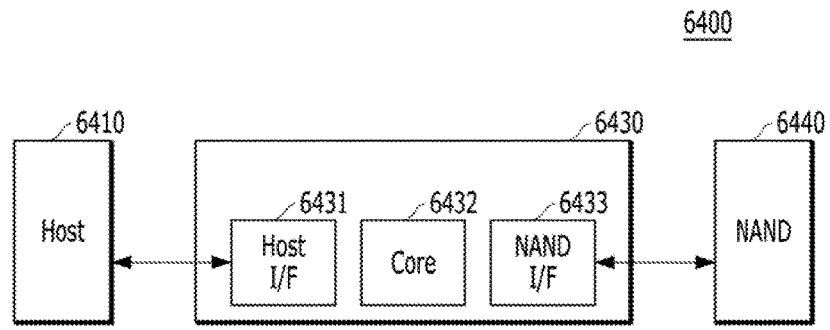

FIG. 13 is a diagram schematically illustrating another example of the data processing system including the memory system in accordance with the present embodiment. FIG. 13 schematically illustrates an embedded Multi-Media Card (eMMC) to which the memory system in accordance with the present embodiment is applied.

Referring to FIG. 13, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system in accordance with the present embodiment. FIGS. 14 to 17 schematically illustrate UFS (Universal Flash Storage) systems to which the memory system in accordance with the present embodiment is applied.

Referring to FIGS. 14 to 17, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 11 to 13, and the UFS cards 6530, 6630, 6730 and 6830 may be embodied in the form of the memory card 6100 described with reference to FIG. 10.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
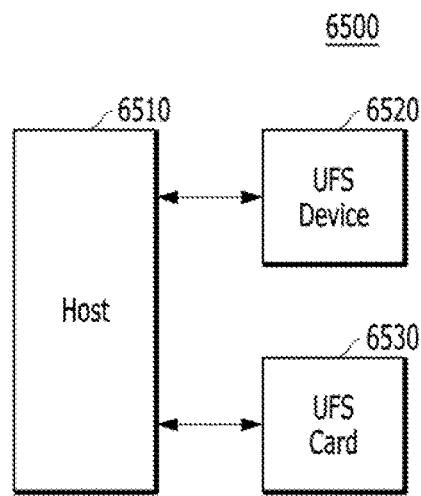

In the UFS system 6500 illustrated in FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
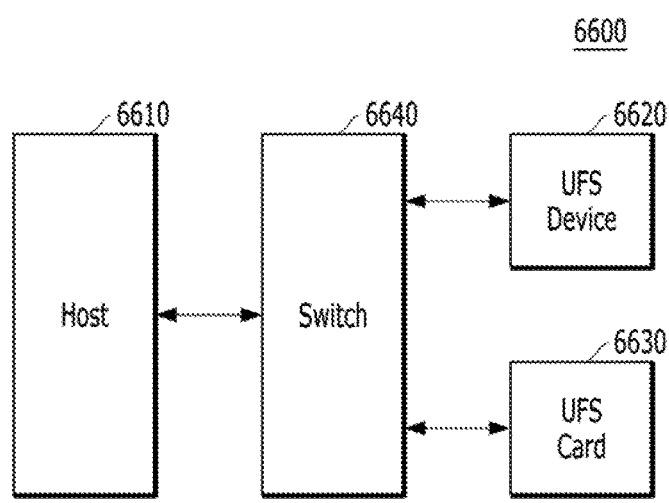

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
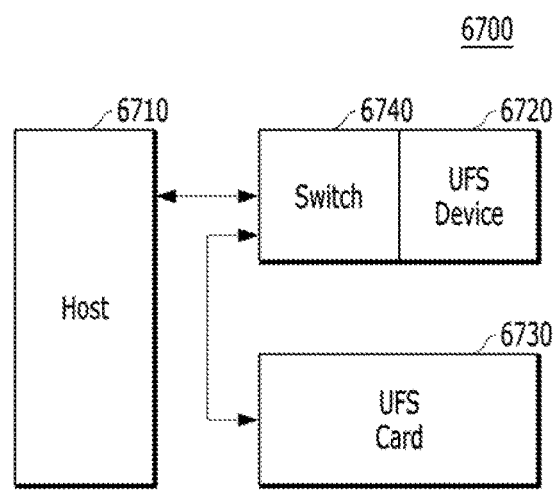

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
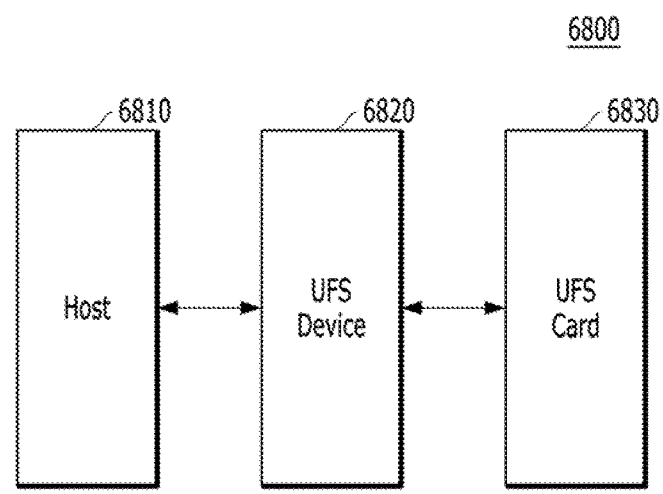

In the UFS system 6800 illustrated in FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
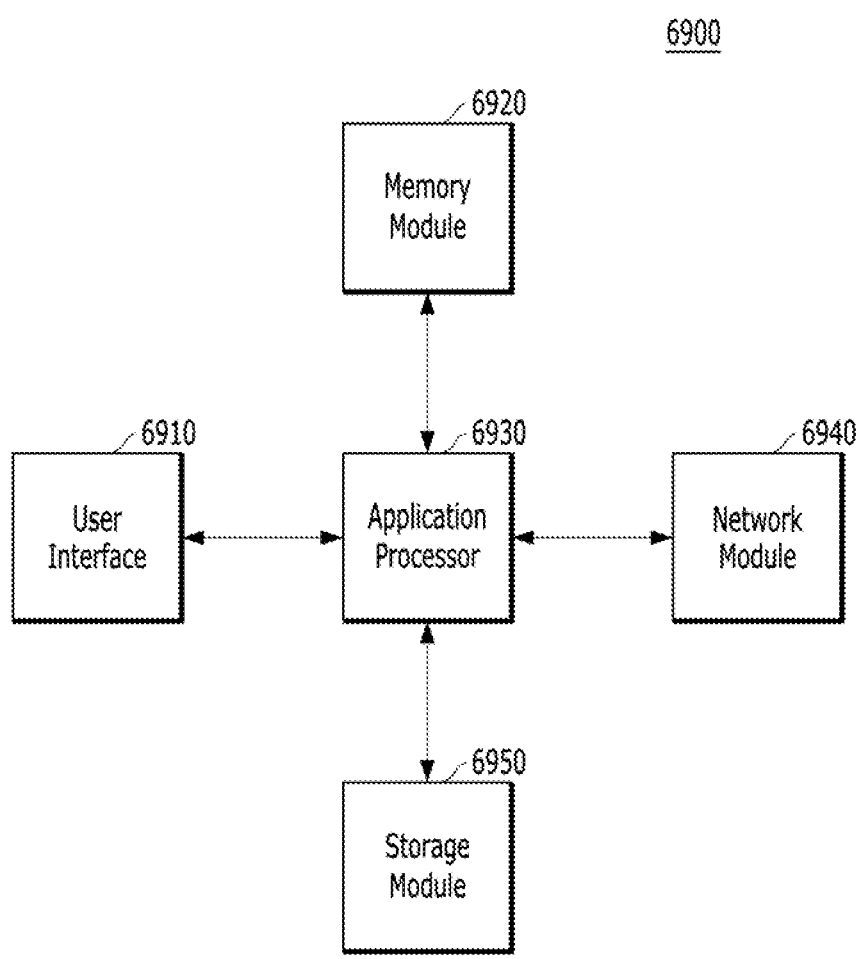

FIG. 18 is a diagram schematically illustrating another example of the data processing system including the memory system in accordance with an embodiment. FIG. 18 is a diagram schematically illustrating a user system to which the memory system in accordance with the present embodiment is applied.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

Although various embodiments have been described for illustrative purposes, it will be apparent to those skilled in the art that various changes and modifications may be made without departing from the spirit and scope of the invention as defined in the following claims.

What is claimed is:

1. A controller comprising:
   a processor suitable for controlling a memory device to read first data from first memory blocks of a first super memory block included in the memory device;
   a memory suitable for storing the first data; and
   a rearranging unit suitable for rearranging the first data stored in the memory based on sequence-information of the first data stored in the memory when the processor copies the first data from the first super memory block to a second super memory block via the memory,
   wherein the first super memory block and the second super memory block include respectively a plurality of memory blocks in the memory device.

2. The controller according to claim 1, wherein the rearranging unit rearranges the first data sequentially based on sequence-information.

3. The controller according to claim 1, wherein the rearranging unit rearranges the first data when a size of the first data is equal to or larger than a first threshold.

4. The controller according to claim 3, wherein the first threshold is equal to or larger than a storage capacity of one or more pages of the first memory blocks included in the first super memory block.

5. The controller according to claim 4, wherein the sequence-information includes information of logic block addresses.

6. The controller according to claim 4, wherein the first data is sequential data.

7. The controller according to claim 4, wherein the processor copies the first data from the first super memory block to the second super memory block according to the order of the sequence-information of the first data.

8. The controller according to claim 4, wherein the first threshold is equal to or smaller than a predetermined storage capacity of the first super memory block.

9. The controller according to claim 1, wherein the processor controls the memory device to write the rearranged first data in the second super memory block of the memory device.

10. The controller according to claim 9, wherein the processor copies the first data during a garbage collection operation.

11. A method of operating a controller, the method comprising:
    controlling a memory device to read first data from first memory blocks of a first super memory block included in the memory device;
    storing the first data read;
    rearranging the first data stored in the memory based on sequence-information of the first data stored in the memory when the first data is copied from the first super memory block to a second super memory block via the memory; and
    controlling the memory device to write the rearranged first data in the second super memory block of the memory device,
    wherein the first super memory block and the second super memory block include respectively a plurality of memory blocks in the memory device.

12. The controller according to claim 11, wherein the rearranging rearranges the first data sequentially based on sequence-information.

13. The method according to claim 11, wherein the rearranging rearranges the first data when a size of first data is equal to or larger than a first threshold.

14. The method according to claim 13, wherein the first threshold is equal to or larger than a storage capacity of one or more pages of the first memory blocks included in the first super memory block.

15. The method according to claim 14, wherein the sequence-information includes information of logic block addresses.

16. The method according to claim 14, wherein the first data is sequential data.

17. The method according to claim 14, wherein the processor copies the first data from the first super memory block to the second super memory block according to the order of the sequence-information of the first data.

18. The method according to claim 14, wherein the first threshold is equal to or smaller than a predetermined storage capacity of the first super memory block.

19. The method according to claim 11, further comprising writing the rearranged first data in the second super memory block of the memory device.

20. The method according to claim 19, wherein the copy operation is performed during a garbage collection operation.

* * * * *